(12) United States Patent
Torma et al.

(10) Patent No.: US 7,075,952 B1
(45) Date of Patent: Jul. 11, 2006

(54) MULTIPLEXING IN A PDH TELECOMMUNICATIONS NETWORK

(75) Inventors: Esa Torma, Helsinki (FI); Harri Lahti, Klaukkala (FI)

(73) Assignee: Nokia Corporation, Espoo (FI)

( * ) Notice: Subject to any disclaimer, the term of this patent is extended or adjusted under 35 U.S.C. 154(b) by 851 days.

(21) Appl. No.: 09/698,881

(22) Filed: Oct. 27, 2000

Related U.S. Application Data

(63) Continuation of application No. PCT/FI99/00451, filed on May 27, 1999.

(30) Foreign Application Priority Data

May 28, 1998 (FI) .................................. 981189

(51) Int. Cl.
*H04J 3/02* (2006.01)
*H04J 1/02* (2006.01)
*H04J 3/22* (2006.01)

(52) U.S. Cl. ...................... 370/538; 370/468; 370/493; 370/545

(58) Field of Classification Search ........ 370/351–356, 370/465, 468, 535–542
See application file for complete search history.

(56) References Cited

U.S. PATENT DOCUMENTS

| | | | | |
|---|---|---|---|---|
| 4,707,826 A | * | 11/1987 | Froggatt | 370/468 |
| 4,761,781 A | * | 8/1988 | Calvignac et al. | 370/465 |
| 4,763,321 A | * | 8/1988 | Calvignac et al. | 370/468 |
| 4,922,483 A | | 5/1990 | Kobayashi | |
| 5,007,050 A | | 4/1991 | Kasparian et al. | |
| 5,313,467 A | * | 5/1994 | Varghese et al. | 370/468 |
| 5,706,285 A | | 1/1998 | Saijonmaa et al. | |
| 5,719,858 A | * | 2/1998 | Moore | 370/468 |
| 5,793,760 A | * | 8/1998 | Chopping | 370/540 |

FOREIGN PATENT DOCUMENTS

| | | |
|---|---|---|
| EP | 0544217 | 6/1993 |
| EP | 0814580 | 12/1997 |
| GB | 2310971 | 9/1997 |

OTHER PUBLICATIONS

International Search Report for PCT/FI99/00451
The International Telegraph and Telephone Consulting Committee, General Aspects of Digital Transmission Systems—Terminal Equipments, "Physical/Electrical Characteristics of Hierarchical Digital Interfaces", Recommendation G.703, Geneva, 1991.
The ATM Forum Technical Committee, "Inverse Multiplexing for ATM (IMA) Specification Version 1.0", AF-PHY-0086.00, Mountain View, CA., Jul. 1997.

* cited by examiner

*Primary Examiner*—Steven Nguyen
(74) *Attorney, Agent, or Firm*—Squire, Sanders, & Dempsey LLP

(57) ABSTRACT

The invention relates to a multiplexing method used in a PDH network. Standard PCM signals are received in the network element, at least some of which are multiplexed on a time-division basis into the same outbound transmission frame, the capacity of the payload portion of the frame substantially corresponding to the capacity required by N PCM signals. In order that ATM cells may be transferred more advantageously than heretofore through an existing PDH network, the multiplexing is implemented as configurable in such a way that the total capacity of the payload portion cab be divided between at least two parts of variable capacity in such a way that each part can be allocated a desired portion of the total capacity of the payload portion in accordance with the current transmission requirement. A part of the payload depending on the desired capacity is allocated to at least one traffic source from a group in which a number of PCM signals constitutes a first traffic source and a number of packet data streams constitutes a second traffic source. The invention is specifically intended for transferring ATM traffic through a PDH network.

11 Claims, 4 Drawing Sheets

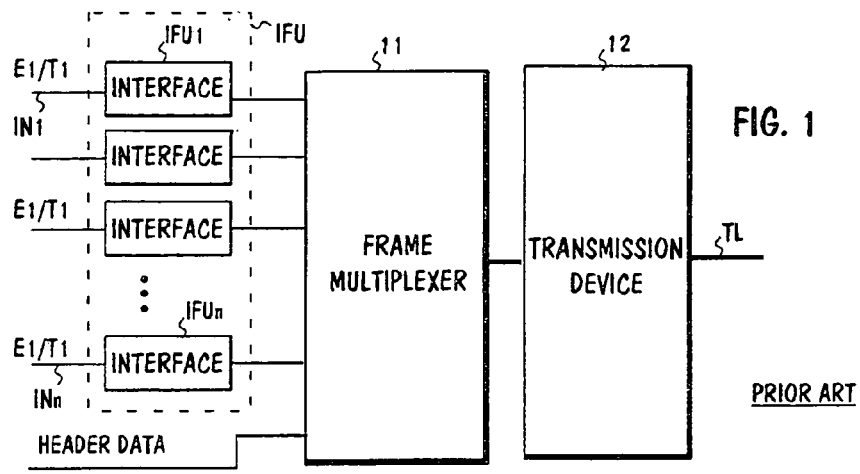
FIG. 1 PRIOR ART
FIG. 2 PRIOR ART
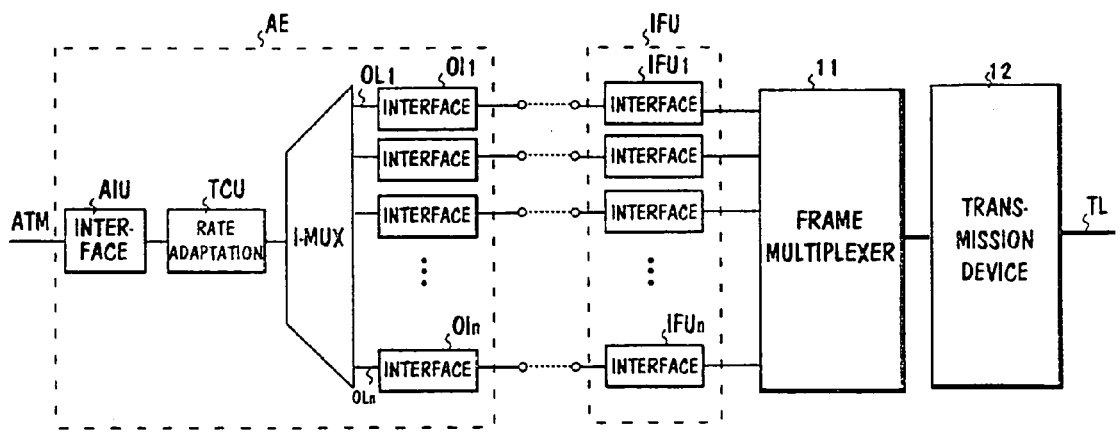
FIG. 3 PRIOR ART

BIT NUMBER →

| SET | 0 | 1 | 2 | 3 | 4 | 5 | 6 | 7 | 8 | 9 | 10 | 11 | 12 | 13 | | 61 | 62 | 63 |
|---|---|---|---|---|---|---|---|---|---|---|---|---|---|---|---|---|---|---|
| 0 | | | | | | | | | ATM | ATM | D2 | D3 | ATM | ATM | | ATM | D2 | D3 |
| 1 | | | | | ATM | ATM | D2 | D3 | ATM | ATM | D2 | D3 | ATM | ATM | | ATM | D2 | D3 |
| 2 | AC | AC | AC | AC | ATM | ATM | D2 | D3 | ATM | ATM | D2 | D3 | ATM | ATM | | ATM | D2 | D3 |
| 3 | ATM | ATM | D2 | D3 | ATM | ATM | D2 | D3 | ATM | ATM | D2 | D3 | ATM | ATM | | ATM | D2 | D3 |
| 4 | | | | | ATM | ATM | D2 | D3 | ATM | ATM | D2 | D3 | ATM | ATM | | ATM | D2 | D3 |
| 5 | | | | | ATM | ATM | D2 | D3 | ATM | ATM | D2 | D3 | ATM | ATM | | ATM | D2 | D3 |
| 6 | | | | | ATM | ATM | D2 | D3 | ATM | ATM | D2 | D3 | ATM | ATM | | ATM | D2 | D3 |
| 7 | ATM | ATM | D2 | D3 | ATM | ATM | D2 | D3 | ATM | ATM | D2 | D3 | ATM | ATM | | ATM | D2 | D3 |
| 8 | | | | | ATM | ATM | D2 | D3 | ATM | ATM | D2 | D3 | ATM | ATM | | ATM | D2 | D3 |
| 9 | | | | | ATM | ATM | D2 | D3 | ATM | ATM | D2 | D3 | ATM | ATM | | ATM | D2 | D3 |
| 10 | ATM | ATM | D2 | D3 | ATM | ATM | D2 | D3 | ATM | ATM | D2 | D3 | ATM | ATM | | ATM | D2 | D3 |
| 11 | ATM | ATM | D2 | D3 | ATM | ATM | D2 | D3 | ATM | ATM | D2 | D3 | ATM | ATM | | ATM | D2 | D3 |
| 12 | AC | AC | AC | AC | ATM | ATM | D2 | D3 | ATM | ATM | D2 | D3 | ATM | ATM | | ATM | D2 | D3 |
| 13 | JC | JC | JC | JC | | | | | ATM | ATM | D2 | D3 | ATM | ATM | | ATM | D2 | D3 |
| 14 | ATM | ATM | D2 | D3 | ATM | ATM | D2 | D3 | ATM | ATM | D2 | D3 | ATM | ATM | | ATM | D2 | D3 |
| 15 | FS | FS | FS | FS | FS | FS | FS | FS | ATM | ATM | D2 | D3 | ATM | ATM | | ATM | D2 | D3 |

FIG. 7

MULTIPLEXING IN A PDH TELECOMMUNICATIONS NETWORK

This application is a continuation of international application serial number PCT/FI99/00451, filed 27 May 1999.

FIELD OF THE INVENTION

The present invention relates generally to data transfer implemented in a conventional PDH (Plesiochronous Digital Hierarchy) network. More specifically, the invention relates to how information streams in more modern transmission systems, particularly cell streams in ATM systems, can be transferred across a PDH network.

BACKGROUND OF THE INVENTION

PDH is still today the predominating multiplexing hierarchy, even though it was taken into global use already in the 1970s. A multiplexing hierarchy means that an upper hierarchy level system having a higher capacity is constructed by combining a given number of lower hierarchy level systems by means of time division multiplexing. There are three different versions of multiplexing hierarchy, one of which is used in Europe, one in the USA and one in Japan. The European system is also used in most parts of the rest of the world.

In the European multiplexing system, 31 64 kbit/s channels and one frame alignment word are multiplexed into a data stream having a rate 2048 kbit/s. This first hierarchy level signal is called E1. In the European system, the upper hierarchy level system is constructed by multiplexing four lower-level signals.

In North America and Japan, on the other hand, 24 channels and one frame synchronizing bit are multiplexed into a data stream having a rate 1544 kbit/s. This first hierarchy level signal is called T1. In the American system, the second hierarchy level system is constructed from four first level systems, the third level system from seven second level systems and the fourth level system from three third level systems. In Japan, the hierarchy is otherwise similar, but the third level system is constructed from five second level systems.

Particularly in trunk connections, however, there has been a shift to using more modern multiplexing systems that offer, for instance, better network management (e.g. easier drop and add functions for tributaries). Such newer multiplexing systems include SDH (Synchronous Digital Hierarchy) and SONET (Synchronous Optical Network). Like PDH, also SDH and SONET are based on 64 kbit/s channels in accordance with the PCM technique, and the conventional PCM signals of the PDH network can be transferred in transmission frames in accordance with the new multiplexing hierarchies.

However, an access network nowadays typically follows a n×E1 or n×T1 multiplexing hierarchy (n is an integer) on account of, for example, the smaller capacity requirement of the access network and the fact that in such a case, the same advantages are gained in the access network as with SDH in the core network (since the multiplexing between the different hierarchy levels is omitted). An additional reason for the hierarchy of an access network is that an access network uses a large number of radio connections, and thus valuable bandwidth is saved by means of the n×E1 hierarchy. (Typical values for n are 2, 4, 8 and 16.)

FIG. 1 depicts how in a conventional PDH network element incoming signals are transferred to a common transmission link TL, which can be constituted for example by a radio path, copper cable or optical fibre. The example only deals with one transmission direction (from left to right in the figure). The reverse operations are carried out in the other transmission direction. Standard PCM signals (a total of n signals) arrive at the network element from various transmission links IN1 . . . INn; in this exemplary case the signals are assumed to be E1 signals (but they can also be for example T1 signals). Each incoming signal has a dedicated input interface IFU1 . . . IFUn in an interface unit IFU, each interface performing the physical adaptation of the corresponding signal to the network element. From the interface unit, each incoming signal is connected to a frame multiplexer 11, in which a transmission frame for the next link TL is formed by multiplexing the incoming (payload) signals (n signals) and in addition a number of other signals that are denoted in the figure with a common reference HEADER DATA. Hence, a serial signal is obtained from the output of the frame multiplexer, and this signal is supplied to a transmission device 12, which is connected to link TL. Depending on the transmission medium, the transmission device still shapes the signal in different ways, but this is no longer essential to the invention.

FIG. 2 is an exemplary illustration of a frame structure that can be constructed for example by a frame multiplexer multiplexing 4 incoming 2 Mbit/s signals (E1 signals). In the example of the figure, the frame is divided into 16 sets each having 64 bits. The bits are divided into payload bits (D0–D3) and overhead bits. The payload bits are denoted in such a way that bit Di (i=0,1,2,3) belongs to the incoming E1 signal having the serial number i. The overhead bits, which are denoted by a grey zone in the figure, typically include frame alignment bits FA, justification control bits JC, additional channel bits AC, internal communication channel bits IC, and bits ED (error detection) and FS (fec syndrome) used for error detection and error correction. The bits used for rate difference equalization are not shown in the figure. Thus, a transmission frame leaving the frame multiplexer has a basic structure consisting of a payload portion (white zone in the figure), having a transmission capacity of e.g. n×E1 or n×T1, and a header portion (grey zone in the figure) in which additional information is transferred.

If it is desired to utilize a PDH network element in accordance with FIG. 1, having a plurality of 2 Mbit/s interfaces, for transfer of e.g. ATM cells, in accordance with the currently used technology this requires addition of an ATM adaptation element AE in accordance with FIG. 3, including for example an inverse multiplexer I-MUX. If the ATM cells are transported for example in a STM-1 transmission module in accordance with the SDH hierarchy, the element has, in compliance with STM-1 capacity, a standard 155 Mbit/s interface unit AIU for the incoming optical signal. In the interface unit, the incoming optical signal is converted into electrical form and the frame structure is disassembled, so that a cell stream is obtained at the output of the interface unit which is connected to a rate adaptation unit TCU. In the rate adaptation unit, the bit rate of the incoming cell stream is adapted to be correct in view of the transmission device 12 by adding or removing idle cells, i.e. cells not carrying a payload. Thereafter, the rate-adapted cell stream is connected to the inverse multiplexer I-MUX, constructing one logical link from n outgoing parallel links (OL1 . . . OLn).

Inverse multiplexing is an operation specified by the ATM Forum; by means of it a high-rate cell stream can be transferred through several parallel links. In this way, user access to an ATM network can be offered or ATM network elements can be interconnected through conventional PDH links, e.g. E1 links, which as a group offer the necessary transmission capacity. In inverse multiplexing, the cells are cyclically multiplexed onto links grouped to form one logical link whose transmission capacity corresponds approximately to the sum of the transmission capacities of the individual links belonging to the group. At the receiving end, compatible inverse demultiplexing is needed to reconstruct the original cell stream, and thus compatible devices must be added at both ends of the link or connection in order to transfer ATM cells.

In the transmission direction, the inverse multiplexer I-MUX distributes the cells arriving from the ATM layer cyclically one at a time to the links OL1 . . . OLn belonging to the group. Moreover, the transmitting multiplexer adds special cells to the cell stream of each parallel link, on the basis of which the receiving end can reconstruct the original cell stream. Cells are transmitted continuously, and thus if cells are not received continuously, the inverse multiplexer adds to the cell streams special padding cells, so that a continuous cell stream is obtained at the physical layer.

Since inverse multiplexing does not relate to the actual invention, it will not be described in detail in this context. Inverse multiplexing has been described in ATM Forum specification AF-PHY-0086.00, in which the interested reader will find a more detailed description of the subject.

From the inverse multiplexer I-MUX, the signals of all links belonging to the group are connected via output interfaces OI1 . . . OIn out from the ATM adaptation element. If the signals are E1 signals and the interfaces are in accordance with the ITU-T recommendation G.703, the signals can thereafter be directly applied to the input interfaces IFU1 . . . IFUn of the frame multiplexer 11 of the transmission device in accordance with FIG. 1. It has been presumed in the figure that the inverse multiplexer uses all input interfaces of the frame multiplexer.

However, the solution described above, utilizing inverse multiplexing/demultiplexing, has certain drawbacks. First, adding an inverse multiplexer and demultiplexer to the link or connection renders the solution expensive and complex. Furthermore, a separate ATM adaptation element will be space-consuming, as it requires its own frame in the equipment room. This is of significance particularly in newer systems in which the transmission devices are located outdoors, for example incorporated into subscriber multiplexers in street cabinets or integrated into base stations of a mobile communications system, which stations are typically located on roofs or walls of buildings.

SUMMARY OF THE INVENTION

It is an object of the invention to eliminate the drawbacks described above and to provide a PDH network element capable of flexibly using its PDH capacity, when necessary, also for transfer of a packet data stream, particularly ATM cells, without any inverse multiplexing being needed.

This object is achieved with a solution as defined in the independent claims.

The idea of the invention is to implement the multiplexing performed by the network element as configurable in such a way that the payload portion of the transmission frame of a conventional PDH device can, when necessary, be divided into at least two parts having variable capacity, in which case one part of the payload portion can, when necessary, be allocated to signals of the PDH network (typically E1 or T1) and one part to packet traffic, particularly ATM cells. Since a given portion of the entire bit capacity of the transmission frame can be allocated to ATM traffic without a n×E1 or n×T1 structure, and since the receiving end has a demultiplexer provided with corresponding specifications, no inverse multiplexing is needed.

When ATM cells are transferred through a network element, the cell stream thus has available capacity corresponding to a given integer number of PCM signals, typically first level signals (a PCM signal in this context generally denotes a first level signal in the PDH hierarchy, even though it can also refer to a substream of a first level signal, such as a 64 kbit/s speech channel). Since the capacity of the portions can be changed by an increment/decrement (typically) corresponding to the capacity of one PCM signal, the capacity can be divided among the desired number of PCM signals and a cell stream. In extreme cases, the entire capacity can be allocated to the use of PCM signals or a cell stream only. What is essential in the solution is that the PDH network element has the ability to allocate transmission capacity in the desired ratio between PDH signals and ATM traffic or other packet traffic, and thus the PDH network element can be flexibly used for switching ATM traffic as well, when necessary.

On account of the solution in accordance with the invention, for example ATM traffic can be transferred more flexibly and economically than heretofore through a conventional PDH network, since inverse multiplexing is no longer needed. Hence, it is not necessary to make expensive additions to the PDH network in order to be able to transfer ATM traffic over a PDH network. This fact is of significance particularly because ATM transmission over a PDH network is at any rate only an intermediate stage in progressing towards "genuine" ATM connections.

Since the solution in accordance with the invention enables omission of inverse multiplexing, the auxiliary/peripheral components required by the inverse multiplexer/demultiplexer, such as cabinets or power sources, can simultaneously be omitted. Moreover, the number of cables and interfaces internal to the network element can be reduced. On account of these changes, the overall reliability of the network element is improved and installation and commissioning work is simplified.

ATM use also saves some transmission capacity, since the cells can be packed directly into the payload portion of the transmission frame (without any need to add other information into the cell stream).

BRIEF DESCRIPTION OF THE DRAWINGS

The invention and its preferred embodiments will be described in greater detail in the following with reference to FIGS. 4 . . . 7 in examples in accordance with the accompanying drawings, in which FIG. 1 illustrates a conventional PDH network element, FIG. 2 illustrates an outbound transmission frame of the device in accordance with FIG. 1, FIG. 3 illustrates a known way of transferring ATM cells in a PDH network.

DETAILED DESCRIPTION OF THE INVENTION

Figures 4, 6:
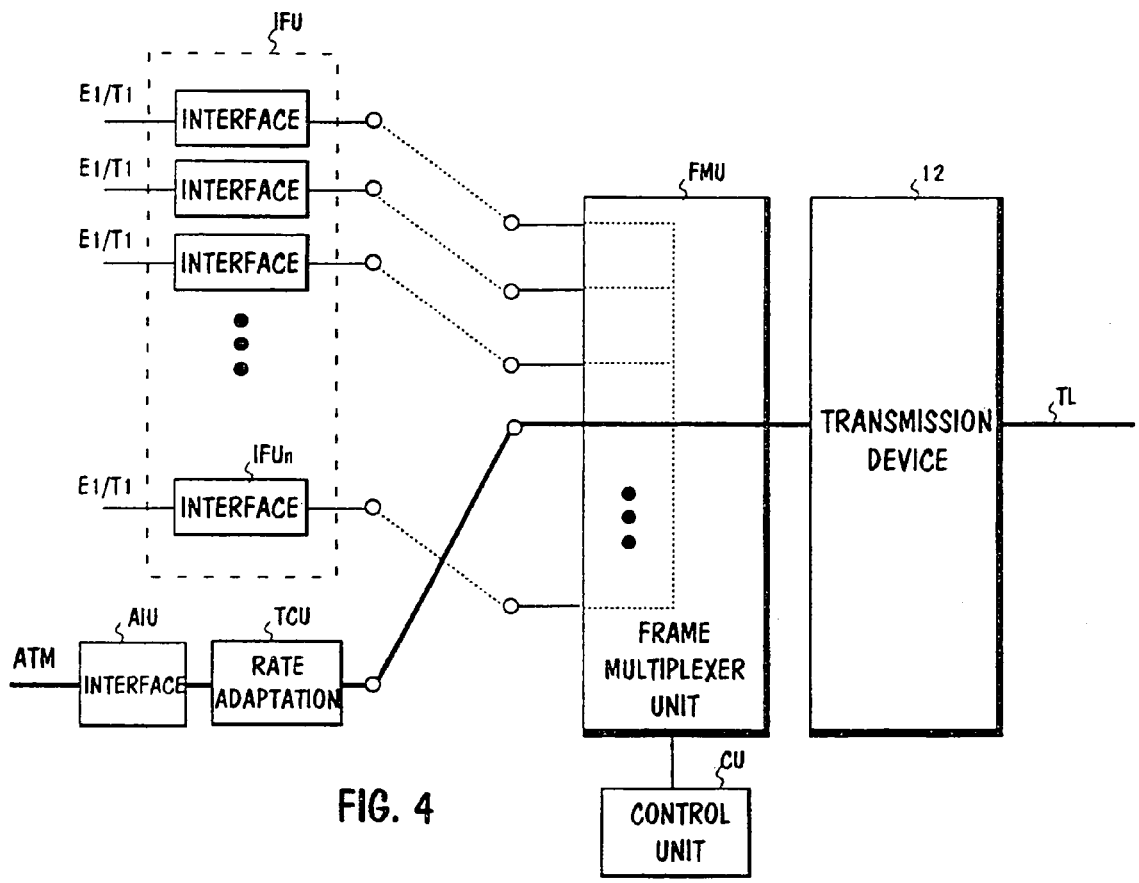
FIG. 4 shows a network element in accordance with the invention by means of which both PDH signals and ATM cells can be transferred.

FIG. 4 is an illustration of the principle of the solution of a network element in accordance with the invention. The frame multiplexing unit FMU of the network element is implemented in such a way that alternatively either PCM signals in accordance with FIG. 1 in a known manner, an ATM cell stream through an interface unit and a rate adaptation unit as described above, or both PCM signals and a cell stream can be connected thereto. When cells are transferred, the cell stream is connected from the output of the rate adaptation unit TCU directly to one input of the frame multiplexing unit. The outbound bit rate to the link is the same in all cases, since the same frame structure is used in all cases.

If only PDH signals are connected to the frame multiplexing unit FMU, they are multiplexed in a known manner into a serial signal to the transmission link TL. This has been denoted with broken line in the figure. If, on the other hand, only an ATM cell stream is connected to the frame multiplexing unit, a high capacity transmission link is formed on link TL through one input of the frame multiplexing unit. This has been denoted with a continuous thicker line in the figure. Said one input can be an input dedicated to one PDH signal, but preferably it is a separate ATM input, since both PDH signals and an ATM cell stream can be simultaneously connected to the device.

The frame multiplexing unit is configured with control unit CU depending on whether it operates in the PDH mode, ATM mode or combined PDH/ATM mode in which the transmission frame comprises both PDH signals and ATM cells. If the payload capacity of the outbound transmission frame is for example 16×E1 (16 2 Mbit/s signals), the capacity can be divided for example in such a way that 3 E1 signals are transferred in the frame, and additionally a capacity corresponding to 13 E1 signals is allocated to ATM cells. Thus, the payload capacity is divided into two parts, one of which is allocated to three E1 signals and the other to ATM traffic. Generally, X E1 or T1 signals ($0 \leq X \leq N$) are transferred in the transmission frame, which allows ATM traffic a capacity corresponding to (N–X) E1 or T1 signals respectively.

Figure 5:
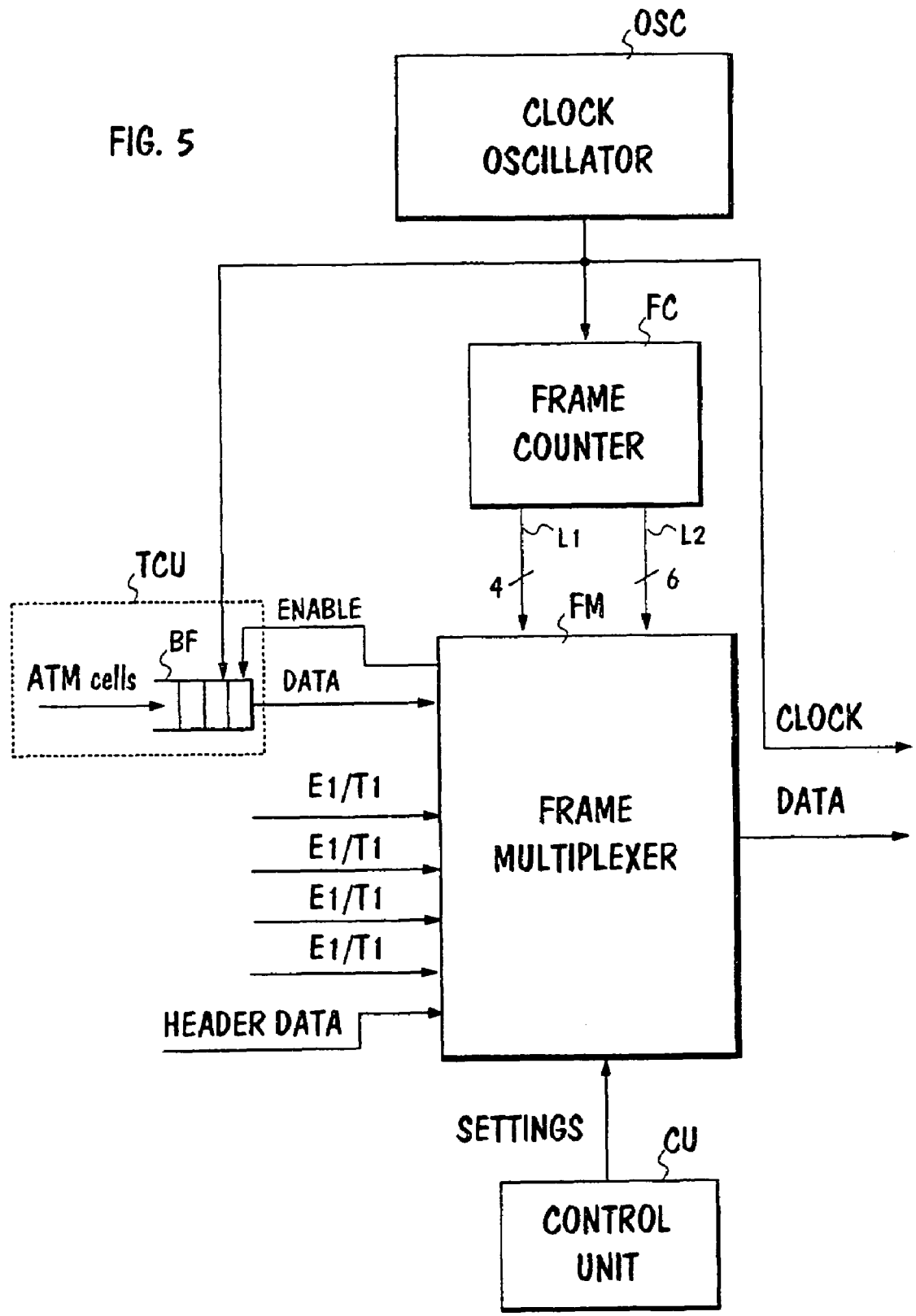
FIG. 5 shows in greater detail the frame multiplexer of the network element of FIG. 4, FIGS. 6 and 7 are exemplary alternatives for the outbound transmission frame in the network element of FIG. 4.

FIG. 5 illustrates in closer detail the structure of the frame multiplexing unit FMU. The unit comprises a clock oscillator OSC, giving a clock signal to a frame counter FC. A transmission frame in accordance with FIG. 2 has been used as an example, whereby a 4-bit number indicating which set of the frame is in progress is obtained from the first output L1 of the frame counter, and a 6-bit number indicating which bit position is concerned in said set is obtained from the second output L2. Thus, the frame counter continually indicates to the frame multiplexer FM which bit position is current in the outbound transmission frame.

In the rate adaptation unit, the bit rate of the cell stream is adapted to correspond to the capacity allocated to the cell stream in the transmission frame. This is effected by adding or removing idle cells. After the rate adaptation, the cells are written into a buffer BF one byte at a time, wherefrom data is read out one bit at a time to the frame multiplexer FM. The rate adaptation unit is capable of detecting cell boundaries, but the frame multiplexer processes the cells as a bit stream only. When the frame counter has read out a bit from the buffer, it gives via an ENABLE line a command for transferring the data in the buffer one memory location forward. However, the buffer need not necessarily be implemented as a physical queue in which all cells are continually moved forward, but the buffer can be implemented as a ring, for example, in which the pertinent reading point is indicated by a pointer. What is essential is that the ATM cells are in a logical queue wherefrom their data is read out in succession.

FIGS. 6 and 7 show two examples of a transmission frame to be sent to link TL. A frame in accordance with FIG. 2 is still used as an example, having 16 sets each comprising 64 bits. In the example of FIG. 6, the entire payload capacity of the frame is allocated for ATM use, whereas in the example of FIG. 7 a capacity corresponding to two E1 signals (half of the payload) is allocated to ATM use, and additionally two E1 signals (D2 and D3) are transferred in the transmission frame. The bits of the different parts should preferably be located in the frame in such a way that within the part allocated to PCM signals, one bit is taken alternately from each signal to be multiplexed, and after one bit has been taken from each PCM signal, a corresponding quantity of bits is taken from the cell stream weighted by the ratio of the capacity allocated to the cell stream and to the PCM signals (by the capacity ratio of the zones). This allows the length of the buffers to be kept at minimum. FIG. 7 illustrates such an alternative.

The control unit gives the frame multiplexer set data indicating e.g. bit by bit in the frame whether said bit position is intended for PDH or ATM use. Information is thus obtained for all bit positions indicated by the frame counter on the input wherefrom a bit is to be read out into said bit position.

In the receiving direction, a similarly configured demultiplexer provided with the same settings performs demultiplexing, as a result of which the bits of the ATM cells are obtained in the receiving buffer in the correct order and the PCM signals are obtained at correct outgoing circuits.

Even though the invention has been explained in the foregoing with reference to examples in accordance with the accompanying drawings, it is obvious that the invention is not restricted thereto, but it can be modified within the scope of the inventive idea set forth in the appended claims. In principle, it is possible for example to divide the payload portion into more than two parts and transfer thereby more than one packet or cell stream. In practice this is unlikely, however, on account of the high capacity requirement of an ATM network. The set of packet data streams stated in the appended claims thus typically comprises only one data stream. The same alternatives also apply to a set of PCM signals, even though in this case it is more likely that the set comprises more than one PCM signal. The idea of the invention can also be applied to substreams of a first level signal. In other words, the capacity division between the parts of the payload can also be changed by a smaller increment/decrement than an increment/decrement corresponding to one E1 or T1 signal, for example an increment/decrement corresponding to one 64 kbit/s channel or even a subchannel thereof. The type of the network element can also vary in many ways; it can have one or more incoming and outgoing links, the link capacities can vary, and the element can also be a subscriber terminal.

The invention claimed is:
1. A network element for a telecommunications network, comprising:
 a first interface unit for receiving standard PCM signals in the network element, wherein parallel standard PCM signals are first level signals in a Plesiochronous Digital Hierarchy;
 a second interface unit for receiving a packet data stream, and multiplexing means, operationally connected to said first and second interface units, for receiving the parallel standard PCM signals from the first interface unit, wherein the parallel standard PCM signals are not multiplexed, for directly multiplexing said parallel standard PCM signals and said packet data stream on a time-division basis into a transmission frame, a total capacity of a payload portion of the frame essentially corresponding to the capacity of N PCM signals, wherein the multiplexing means are provided with configuring and allocating means for dividing the total capacity of the payload portion between at least two parts of variable capacity, wherein each part is configured to be allocated a desired portion of the total capacity of the payload portion in accordance with a current transmission requirement, and for allocating a part with the desired capacity to at least one traffic source from a group in which a number of PCM signals constitutes a first traffic source and a number of packet data streams constitutes a second traffic source;

wherein said second interface unit comprises rate adaptation means for adapting bit rate of the packet data stream to correspond to the capacity of the payload portion allocated to the packet stream to correspond to the capacity of the payload portion allocated to the packet stream, the output of said rate adaptation means being directly connected to said multiplexing means.

2. A network element as claimed in claim 1, wherein a portion of the total capacity of the transmission frame corresponding to the capacity required by one PCM signal multiplied by an integer is configured to be allocated to all traffic sources using the same transmission frame.

3. A network element as claimed in claim 1, at least one of the traffic sources constituting by an ATM cell stream.

4. A network element as claimed in claim 1, wherein bits of each part are configured to be interleaved in the payload portion and the bits of the payload portion are configured to comprise an indication bit-specifically whether they are allocated for the use of PCM signals or a packet data stream.

5. A network element as claimed in claim 3, the capacity of the payload portion being entirely allocated for the use of one packet data stream.

6. A network element for a telecommunications network, configured to:
 receive parallel standard PCM signals in a first interface unit of the network element said parallel standard PCM signal being first level signals in a Plesiochronous Digital Hierarchy;
 receive a packet data stream in a second interface unit of the network element;
 receive the parallel standard PCM signals from the first interface unit, wherein the parallel standard PCM signals are not multiplexed and directly multiplex said parallel standard PCM signals and said packet data stream on a time-division basis into a transmission frame, a total capacity of the payload portion of the frame essentially corresponding to the capacity of N PCM signals, wherein the multiplexing is configured to divide the total capacity of the payload portion between at least two parts of variable capacity, wherein each part is configured to be allocated a desired portion of the total capacity of the payload portion in accordance with a current transmission requirement, and to allocate a part with the desired capacity to at least one traffic source from a group in which a number of PCM signals constitutes a first traffic source and a number of packet data streams constitutes a second traffic source; and
 adapt a bit rate of the packet data stream to correspond to the capacity of the payload portion allocated to the packet stream in said second interface unit directly before multiplexing.

7. A method for multiplexing in a telecommunications network, the method comprising;
 receiving parallel standard PCM signals in a first interface unit of a network element, the standard PCM signals being first level signals in a Plesiochronous Digital Hierarchy;
 receiving a packet data stream in a second interface unit of the network element;
 receiving the parallel standard PCM signals from the first interface unit, wherein the parallel standard PCM signals are not multiplexed and directly multiplexing said parallel PCM signals and said packet data stream on a time-division basis into a transmission frame, a total capacity of the payload portion of the frame essentially corresponding to the capacity of N PCM signals;
 dividing the total capacity of the payload portion between at least two parts of variable capacity, wherein each part is allocated a desired portion of the total capacity of the payload portion in accordance with a current transmission requirement;
 allocating a part with the desired capacity to at least one traffic source from a group in which a number of PCM signals constitutes a first traffic source and a number of packet data streams constitutes a second traffic source; and
 adapting bit rate of the packet data stream in said second interface unit to correspond to the capacity of the payload portion allocated to the packet stream directly before multiplexing.

8. A method as claimed in claim 7, further comprising allocating a portion of the total capacity of the transmission frame corresponding to the capacity required by one PCM signal multiplied by an integer to all traffic sources using the same transmission frame.

9. A method as claimed in claim 7, further comprising interleaving bits of each part in the payload portion and indicating for the bits of the payload portion bit-specifically whether the bits are allocated for the use of PCM signals or a packet data stream.

10. A method as claimed in claim 7, wherein at least one of the traffic sources is constituted by an ATM cell stream.

11. A method as claimed in claim 7, wherein the capacity of the payload portion is entirely allocated for the use of one packet data stream.

* * * * *